J. HAKANSON & A. WEBER.
MANUALLY OPERATED CIRCULAR SAW.
APPLICATION FILED JUNE 13, 1918.
1,299,831.  Patented Apr. 8, 1919.
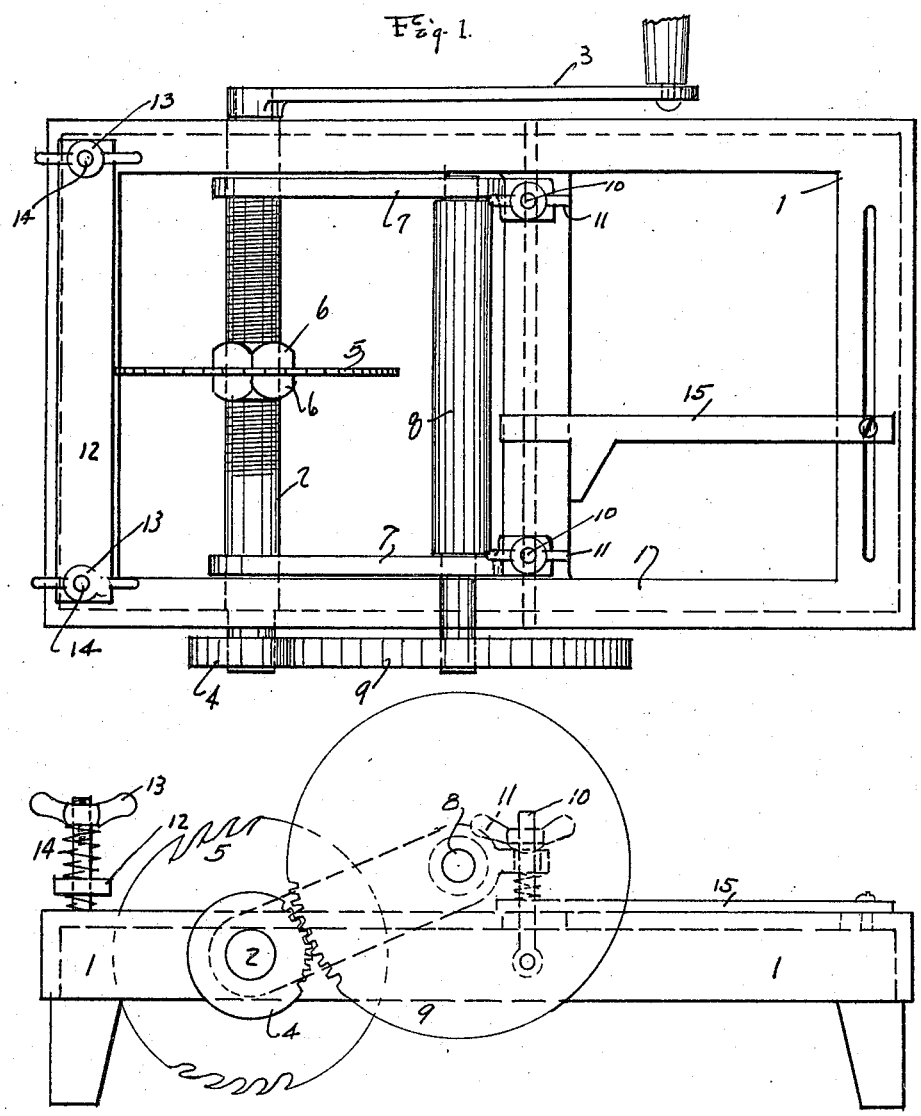

UNITED STATES PATENT OFFICE.

JOHN HAKANSON AND ALBERT WEBER, OF SEATTLE, WASHINGTON.

MANUALLY-OPERATED CIRCULAR SAW.

1,299,831.   Specification of Letters Patent.   Patented Apr. 8, 1919.

Application filed June 13, 1918. Serial No. 239,729.

*To all whom it may concern:*

Be it known that we, JOHN HAKANSON and ALBERT WEBER, citizens of the United States, residing at Seattle, in the county of King and State of Washington, have invented certain new and useful Improvements in Manually-Operated Circular Saws, of which the following is a specification.

This invention relates to improvements in manually operated circular saws and has for its principal object to provide an improved and novel portable circular saw device which is manually operated for the use of journeymen, carpenters and the like; to provide in a device of this general character an improved adjustable feed roll construction and improved and simplified adjustment means for the saw and saw guide.

Other objects will appear as our invention is more fully explained in the following specification, illustrated in the accompanying drawings and pointed out in the appended claim.

In the drawings Figure 1 is a plan view of our device. Fig. 2 is a side elevation of same.

Referring more particularly to the drawings numeral 1 indicates a rectangular frame transversely of which a saw arbor 2 is mounted below the top surface of the frame. To one end of the arbor 2 a manually operated handle 3 is secured while to the other end a pinion 4 is fastened. A circular saw 5 is mounted upon the arbor which is threaded and with which nuts 6 coöperate in order to clamp the saw in any desired position along the length of the arbor. A pair of rocker arms 7 are revolubly mounted at either end of the arbor just inside the confines of the frame 1 and at their free ends support a feed roll 8 which is grooved throughout its length. Feed roll 8 is operated by means of a gear wheel 9 which coöperates with pinion 4, one end of the feed roll extending beyond the rocker arm 7 which supports the gear 9. The feed roll is adjusted vertically with respect to the top of the frame 1 by means of adjustment screws 10 and coöperating thumb nuts 11 one at the end of each of the rocker arms. A guide 12 for holding the timber down after it passes the saw is mounted on the other end of the frame and is adjustable vertically by means of thumb nuts 13 which screws on to screws 14. A guide 15 is also provided in front of the feed roll and is slidable and adjustable laterally in order to set the proper distance of cutting width for the lumber. In operation the guide 15 and saw 5 are set in proper relationship laterally and the board to be ripped is started beneath the feed roll 8. The hand lever 3 is turned quite rapidly thus setting the saw and feed roll in motion. The saw cutting the board when it brings it in contact therewith. As the board passes the saw it engages the underside of the guide 12 which may then be adjusted to hold the outer end of the board down in contact with the frame and prevent the board from flapping or getting out of position after the rear end of it has passed the feed roll 8.

Having described our invention, what we claim as new and desire to protect by Letters Patents, is:—

In a saw of the class described, the combination of a frame, an arbor mounted in the frame, a saw on the arbor, arms pivotally mounted on the arbor inside the frame and extending away from same and inclining upwardly therefrom and formed near their free ends with alined bearings, each arm having an extension at its free end provided with a substantially vertical opening, a feed roll mounted in the alined bearings, gearing between the arbor and the feed roll, vertically disposed screws pivotally mounted at their lower ends on the inside of the frame, said screws extending through the vertical openings in the extensions, adjusting nuts on the screws to engage the extensions, and springs interposed between the extensions and the frame to normally hold the arms elevated.

In testimony whereof we affix our signatures in the presence of two witnesses.

JOHN HAKANSON.
ALBERT WEBER.

Witnesses:
MARGUERITE LEYDA,
GENEVA ELDER.

Copies of this patent may be obtained for five cents each, by addressing the "Commissioner of Patents, Washington, D. C."